US008568266B2

(12) United States Patent
Joergensson et al.

(10) Patent No.: US 8,568,266 B2
(45) Date of Patent: Oct. 29, 2013

(54) OVERDRIVE UNIT

(75) Inventors: Mathias Joergensson, Stenungsund (SE); Lars Andersson, Goeteborg (SE)

(73) Assignee: Volvo Car Corporation (SE)

(*) Notice: Subject to any disclaimer, the term of this patent is extended or adjusted under 35 U.S.C. 154(b) by 128 days.

(21) Appl. No.: 13/277,530

(22) Filed: Oct. 20, 2011

(65) Prior Publication Data
US 2012/0100951 A1    Apr. 26, 2012

(30) Foreign Application Priority Data

Oct. 22, 2010  (EP) .................................... 10188564

(51) Int. Cl.
*F16H 37/08*        (2006.01)
(52) U.S. Cl.
USPC .......................................... 475/204; 475/206
(58) Field of Classification Search
USPC .......................................... 475/200, 204, 206
See application file for complete search history.

(56) References Cited

U.S. PATENT DOCUMENTS

| | | |
|---|---|---|
| 2,618,359 A | 11/1952 | Alden |
| 2,666,337 A | 1/1954 | Brownyer |
| 4,417,642 A * | 11/1983 | Suzuki et al. ................. 180/249 |
| 5,554,080 A | 9/1996 | Dangel |
| 8,172,712 B2 * | 5/2012 | Jarzyna et al. ................ 475/204 |

FOREIGN PATENT DOCUMENTS

| | | |
|---|---|---|
| CN | 101424328 A | 5/2009 |
| EP | 0 091 406 A2 | 10/1983 |
| EP | 0 091 407 A1 | 10/1983 |
| EP | 0 658 705 A1 | 6/1995 |
| FR | 2 532 708 A3 | 3/1984 |
| FR | 2 791 407 A1 | 9/2000 |

OTHER PUBLICATIONS

European Search Report Dated Mar. 3, 2011, Applicant Volvo Car Corporation, Application No. 10188564.8-1254, 5 Pages.

* cited by examiner

*Primary Examiner* — Edwin A Young
(74) *Attorney, Agent, or Firm* — Brooks Kushman P.C.

(57) ABSTRACT

An overdrive unit for a vehicle is operatively connectable to a transverse mounted front wheel drive vehicle gearbox, which has been arranged to provide a single output shaft. The overdrive unit includes a planetary gear set and a differential are mounted together in an overdrive unit housing such that the output shaft of the vehicle gearbox is operatively connectable to the planetary gear set. The planetary gear set is further operatively connectable to drive shafts of the vehicle via the differential. A clutch unit is provided for selectively engaging gearing of the planetary gear set.

18 Claims, 4 Drawing Sheets

OVERDRIVE UNIT

CROSS-REFERENCE TO RELATED APPLICATIONS

This application claims foreign priority benefits under 35 U.S.C. §119(a)-(d) to EP 10188564.8, filed Oct. 22, 2010, which is hereby incorporated by reference in its entirety.

TECHNICAL FIELD

The present disclosure relates to an overdrive unit for a transverse mounted front wheel drive vehicle gearbox.

BACKGROUND

An overdrive unit is a device which has been commonly used in automotive vehicles to allow the choice of an extra-high overall gear ratio for high speed cruising, thus saving fuel, at the cost of less torque.

Early manual automotive transmissions were limited to three or sometimes four speeds, with only the more sophisticated having five speeds. This left an unfulfilled need for a higher gear ratio for highway cruising, which was filled by the addition of separate overdrive units (auxiliary or bolt-on), in order to simulate an extra gear.

It is today a desire to achieve even more fuel efficient automotive vehicles and even though manual automotive transmissions today sometimes will have more than 5 speeds, the engine speed will sometimes be too high for optimum $CO_2$ driving at the highest gear.

However, with manual automotive transmissions (gearboxes) it is difficult to add more than 6 speeds, because of the increased effort it means for the driver to manually change gears more frequently. Furthermore, it will be difficult for the driver to decide when to change gears for optimum $CO_2$ driving.

Also, the addition of more gears will normally increase the overall length of the transmission, while the addition of gears in a base transmission would normally require substantial redesign of the vehicle due to the increased space requirements.

SUMMARY

One object of the disclosure is to provide an overdrive unit for a transverse mounted front wheel drive vehicle gearbox which has been arranged to provide a single output shaft, through which increased fuel efficiency and reduced $CO_2$ emissions may be achieved.

Thanks to the provision of an overdrive unit where: a planetary gear set and a differential are mounted together in an overdrive unit housing such that the output shaft of the vehicle gearbox is operatively connectable to the planetary gear set; the planetary gear set is further operatively connectable to drive shafts of the vehicle via the differential; and a clutch unit is provided for selectively engaging gearing of the planetary gear set, an overdrive unit which enables increased fuel efficiency and reduced $CO_2$ emissions is provided.

BRIEF DESCRIPTION OF THE DRAWINGS

In the following, various embodiments will be described in greater detail by way of example only with reference to attached drawings, in which.

Still other objects and features of the present disclosure will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

Figure 1:
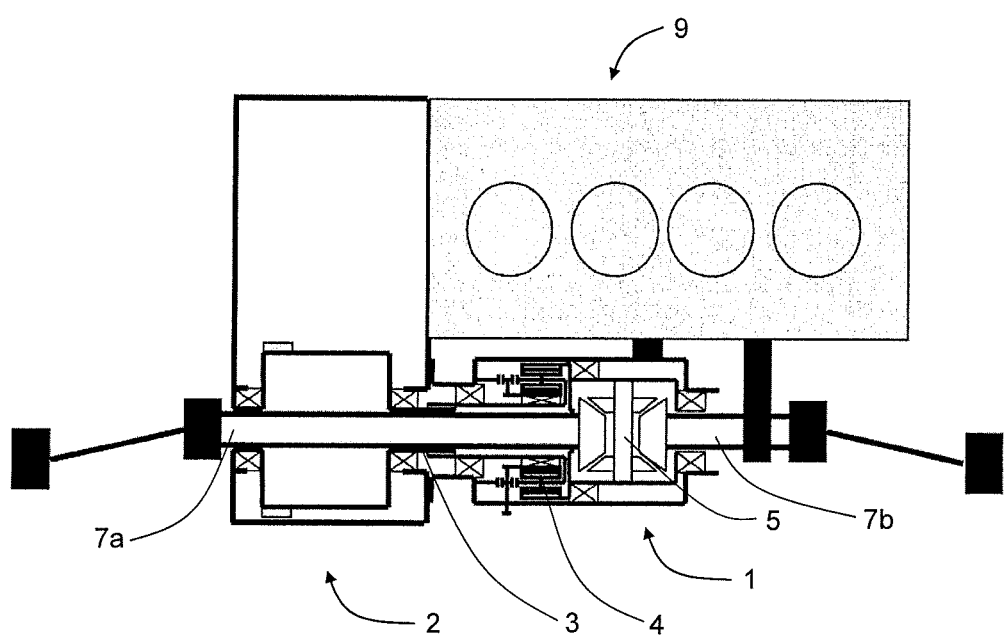
FIG. 1 is a schematic section of a vehicle drivetrain including an overdrive unit in accordance with a first embodiment of the present invention.
Figure 3:
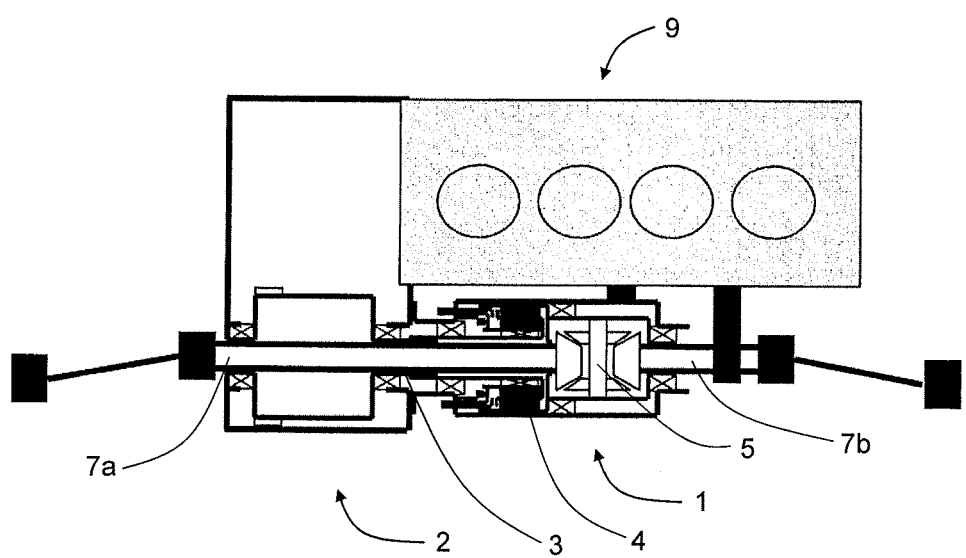
FIG. 3 is a schematic section of a vehicle drivetrain including an overdrive unit in accordance with a second embodiment of the present invention.

In overview, the present disclosure relates to an overdrive unit 1 which is operatively connectable to a transverse mounted front wheel drive vehicle gearbox 2 which has been arranged to provide a single output shaft 3. Two embodiments are illustrated schematically in FIGS. 1 and 3, respectively.

The overdrive unit 1 may be mounted as a hang on unit requiring minimal modification of a standard transmission gearbox 2. It should be enough to replace a differential 5 of the standard transmission gearbox 2 with a hollow output shaft 3 mounted inside the standard gearbox housing and using standard differential bearings and sealings. The use of a hollow output shaft 3 enables one of the drive shafts 7a of the vehicle to pass through the gearbox 2 and exit the gearbox 2 at a normal position.

The overdrive unit 1 comprises an epicyclic gear set or planetary gear set 4, comprising a sun gear 4a, a planetary gear carrier 4b, one or more planetary gears 4c and a ring gear 4d. The overdrive unit 1 is bolted towards a transversely mounted front wheel drive transmission unit or gearbox 2 and possibly also to the internal combustion engine 9. It may either transfer an input shaft of the overdrive unit 1 directly to an output shaft of the overdrive unit 1 (1:1), or increase the rotational speed of the output shaft of the overdrive unit 1, such that it turns faster than the input shaft of the overdrive unit 1. Thus the output shaft of the overdrive unit 1 may be "over-driven" relative to the input shaft of the overdrive unit 1.

The planetary gear set 4 and a differential 5 are mounted together in an overdrive unit housing 6 such that the output shaft 3 of the vehicle gearbox 2 is operatively connectable to the planetary gear set 4. The planetary gear set 4 is further operatively connectable to drive shafts 7a, 7b of the vehicle via the differential 5. A clutch unit 8 is provided for selectively engaging gearing of the planetary gear set 4.

It is preferred that the output shaft 3 from the vehicle gearbox 2 is operatively connectable to a planetary gear carrier 4b of the planetary gear set 4, and that an input axis of the differential 5 is connected to a ring gear 4d of the planetary gear set 4.

Figure 2:
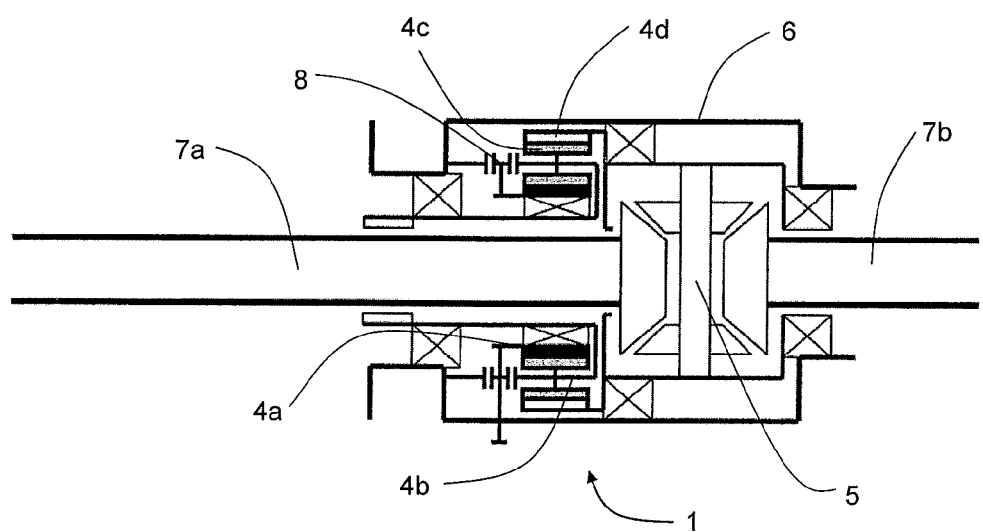
FIG. 2 is an enlarged view of the overdrive unit according to FIG. 1.

FIG. 2 illustrates in more detail an overdrive unit 1 in accordance with a first embodiment of the present disclosure. In accordance with this first embodiment the clutch unit 8 is arranged to selectively connect a sun gear 4a of the planetary gear set 4 with the overdrive unit housing 6 for an overdrive mode, or connect the sun gear 4a with the planetary gear carrier 4b for a 1:1 mode, or release the sun gear 4a for a disconnect mode.

For this first embodiment the planetary gear set 4 should preferably be dimensioned to transfer torque at all gears of the vehicle gearbox 2 and should thus preferably be possible to engage at all gears of the vehicle gearbox 2. It has been found that an ability to engage the overdrive unit 1 on all gears provides a possibility of reducing the fuel consumption of an associated vehicle in the magnitude of 5-10%.

Through the placement of the planetary gear set 4 between the gearbox 2 and the differential 5 it becomes possible to disconnect the gearbox 2 and "free-wheel" in the disconnect mode. Hereby it becomes possible to reduce drag losses and achieve improved fuel economy, e.g. through combining this functionality with a so called start/stop system where an internal combustion engine is shut down allowing the vehicle to "free-wheel" when traveling downhill.

Figure 4:
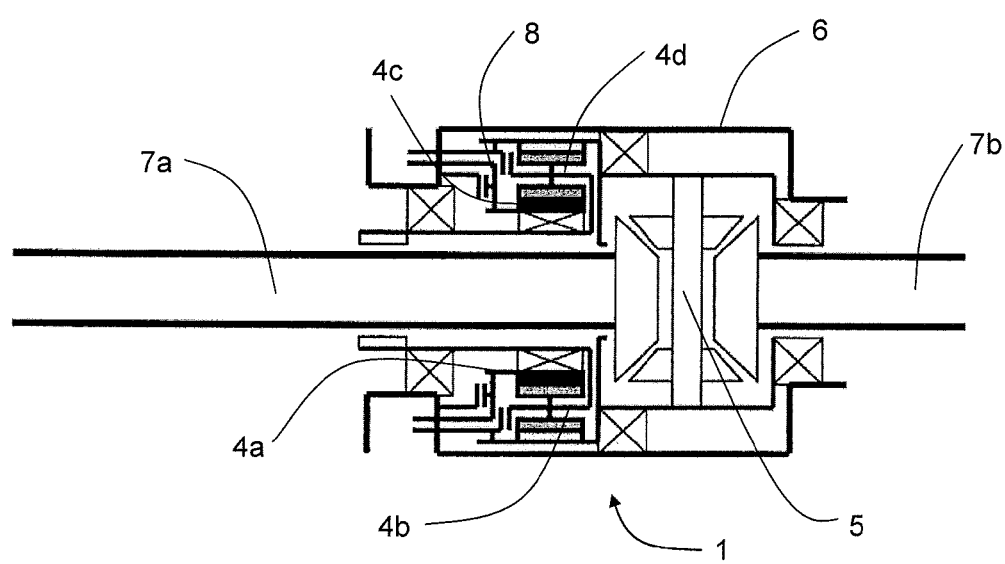
FIG. 4 is an enlarged view of the overdrive unit according to FIG. 3.

FIG. 4 illustrates in more detail an overdrive unit 1 in accordance with a second embodiment of the present disclosure. In accordance with this second embodiment, the clutch unit 8 is arranged to selectively connect a sun gear 4a of the planetary gear set 4 with the overdrive unit housing 6 for an overdrive mode, or connect the planetary gear carrier 4b with the ring gear 4d for a 1:1 mode, or release the sun gear 4a and the planetary gear carrier 4b for a disconnect mode.

For this second embodiment, the planetary gear set 4 should only be dimensioned to transfer torque at the highest gear of the vehicle gearbox 2. Thus, in accordance with this second embodiment, it will be possible to make the planetary gear set 4 smaller, i.e. more compact, than the planetary gear set 4 required for the first embodiment.

The disconnect mode of this second embodiment provides possibilities for the same functionalities as described for the first embodiment above.

In both the first and second embodiments it is envisaged that the clutch unit 8 may comprise at least one of a standard synchronizer, a dog clutch and a wet clutch. The clutch unit 8 may comprise at least one of an electric actuator and a hydraulic actuator. The clutch unit 8 may be actuated automatically or manually by a driver of the vehicle, and does not require operation of a clutch pedal. The clutch unit 8 is preferably controlled automatically by an electronic control unit.

As mentioned above, in both the first and the second embodiment it is envisaged that the overdrive unit 1 may be provided as a hang-on unit having a separate lubrication system and being arranged for mounting to a standard front wheel drive vehicle gearbox 2 which has been arranged to provide a single output shaft 3.

From a packaging aspect, which is often critical in today's front wheel drive vehicles, the provision of the overdrive unit 1 in accordance with embodiments of the present disclosure enables use of already available packaging space, such as packaging space provided for an all wheel drive power take off unit, which would not be mounted to an exclusively front wheel drive model of the vehicle.

The overdrive unit 1 in accordance with embodiments of the present disclosure may also be made attachable to the standard front wheel drive vehicle gearbox 2 using the same bolting and the same size and shape splines for connecting the shafts as those suitable for attaching an all wheel drive power take off unit. In this way cost is reduced as fewer variants are required.

Further, the over drive unit according to embodiments of the present disclosure may be mounted to both manual and automatic transversely mounted front wheel drive vehicle gearboxes 2 which have been arranged to provide single output shafts 3.

The present disclosure also relates to a vehicle powertrain, which comprises an overdrive unit 1 as described above.

The invention is not limited to the above-described embodiments, but may be varied within the scope of the following claims.

Thus, while there have been shown and described and pointed out fundamental novel features of the invention as applied to various embodiments thereof, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An overdrive unit for a vehicle, the overdrive unit being operatively connectable to a transverse mounted front wheel drive vehicle gearbox arranged to provide a single output shaft, the overdrive unit comprising:
   an overdrive unit housing;
   a planetary gear set and a differential mounted together in the overdrive unit housing such that the planetary gear set is operatively connectable to the output shaft of the vehicle gearbox, wherein the planetary gear set is further operatively connectable to drive shafts of the vehicle via the differential; and
   a clutch unit for selectively engaging gearing of the planetary gear set;
   wherein the overdrive unit is provided as a hang-on unit having a separate lubrication system and being arranged for mounting to the front wheel drive vehicle gearbox.

2. The overdrive unit according to claim 1 wherein the planetary gear set includes a planetary gear carrier that is operatively connectable to the output shaft from the vehicle gearbox, and a ring gear associated with the differential.

3. The overdrive unit according to claim 2 wherein the planetary gear set further includes a sun gear, and wherein the clutch unit is arranged to selectively:
   connect the sun gear with the overdrive unit housing for an overdrive mode; or
   connect the sun gear with the planetary gear carrier for a 1:1 mode; or
   release the sun gear for a disconnect mode.

4. The overdrive unit according to claim 2 wherein the planetary gear set further includes a sun gear, and wherein the clutch unit is arranged to selectively:
   connect the sun gear with the overdrive unit housing for an overdrive mode; or connect the planetary gear carrier with the ring gear for a 1:1 mode; or release the sun gear and the planetary gear carrier for a disconnect mode.

5. The overdrive unit according to claim 1 wherein the clutch unit comprises at least one of a standard synchronizer, a dog clutch and a wet clutch.

6. The overdrive unit according to claim 5 wherein the clutch unit comprises at least one of an electric actuator and a hydraulic actuator.

7. A vehicle powertrain comprising the overdrive unit according to claim 1.

8. A vehicle powertrain comprising a transverse mountable front wheel drive vehicle gearbox having a single output shaft, and the overdrive unit according to claim 1 connected to the output shaft.

9. The vehicle powertrain according to claim 8 wherein the planetary gear set of the overdrive unit includes a planetary gear carrier that is operatively connectable to the output shaft from the vehicle gearbox, and a ring gear associated with the differential.

10. The vehicle powertrain of claim 9 wherein the planetary gear set further includes a sun gear, and wherein the clutch unit is arranged to selectively connect the sun gear with the overdrive unit housing for an overdrive mode, or connect the sun gear with the planetary gear carrier for a 1:1 mode, or release the sun gear for a disconnect mode.

11. The vehicle powertrain of claim 9 wherein the planetary gear set further includes a sun gear, and wherein the clutch unit is arranged to selectively connect the sun gear with the overdrive unit housing for an overdrive mode, or connect the planetary gear carrier with the ring gear for a 1:1 mode, or release the sun gear and the planetary gear carrier for a disconnect mode.

12. The vehicle powertrain of claim 8 wherein the clutch unit of the overdrive unit comprises at least one of a standard synchronizer, a dog clutch and a wet clutch.

13. The vehicle powertrain of claim 12 wherein the clutch unit comprises at least one of an electric actuator and a hydraulic actuator.

14. An overdrive unit for a vehicle, the overdrive unit being operatively connectable to a transverse mounted front wheel drive vehicle gearbox arranged to provide a single output shaft, the overdrive unit comprising:

an overdrive unit housing;

a planetary gear set and a differential mounted together in the overdrive unit housing such that the planetary gear set is operatively connectable to the output shaft of the vehicle gearbox, wherein the planetary gear set is further operatively connectable to drive shafts of the vehicle via the differential, and wherein the planetary gear set includes a planetary gear carrier that is operatively connectable to the output shaft of the vehicle gearbox, and a sun gear; and a clutch unit configured to selectively: connect the sun gear with the overdrive unit housing for an overdrive mode, or connect the sun gear with the planetary gear carrier for a 1:1 mode; or release the sun gear for a disconnect mode.

15. A vehicle powertrain comprising a transverse mountable front-wheel drive vehicle gear box having a single output shaft, and the overdrive unit according to claim 14.

16. The vehicle powertrain of claim 15 wherein the overdrive unit is provided as a hang-on unit having a separate lubrication system, and the overdrive unit housing is mounted to the front wheel drive vehicle gearbox.

17. An overdrive unit for a vehicle, the overdrive unit being operatively connectable to a transverse mounted front wheel drive vehicle gearbox arranged to provide a single output shaft, the overdrive unit comprising:

an overdrive unit housing;

a planetary gear set and a differential mounted together in the overdrive unit housing such that the planetary gear set is operatively connectable to the output shaft of the vehicle gearbox, wherein the planetary gear set is further operatively connectable to drive shafts of the vehicle via the differential, and wherein the planetary gear set includes a planetary gear carrier that is operatively connectable to the output shaft of the vehicle gearbox, a ring gear, and a sun gear; and a clutch unit arranged to selectively: connect the sun gear with the overdrive unit housing for an overdrive mode, or connect the planetary gear carrier with the ring gear for a 1:1 mode, or release the sun gear and the planetary gear carrier for a disconnect mode.

18. A vehicle powertrain comprising the overdrive unit according to claim 17.

* * * * *